Dec. 15, 1964
C. W. MUSSER
3,161,082
WAVE GENERATOR
Filed April 11, 1962
2 Sheets-Sheet 1
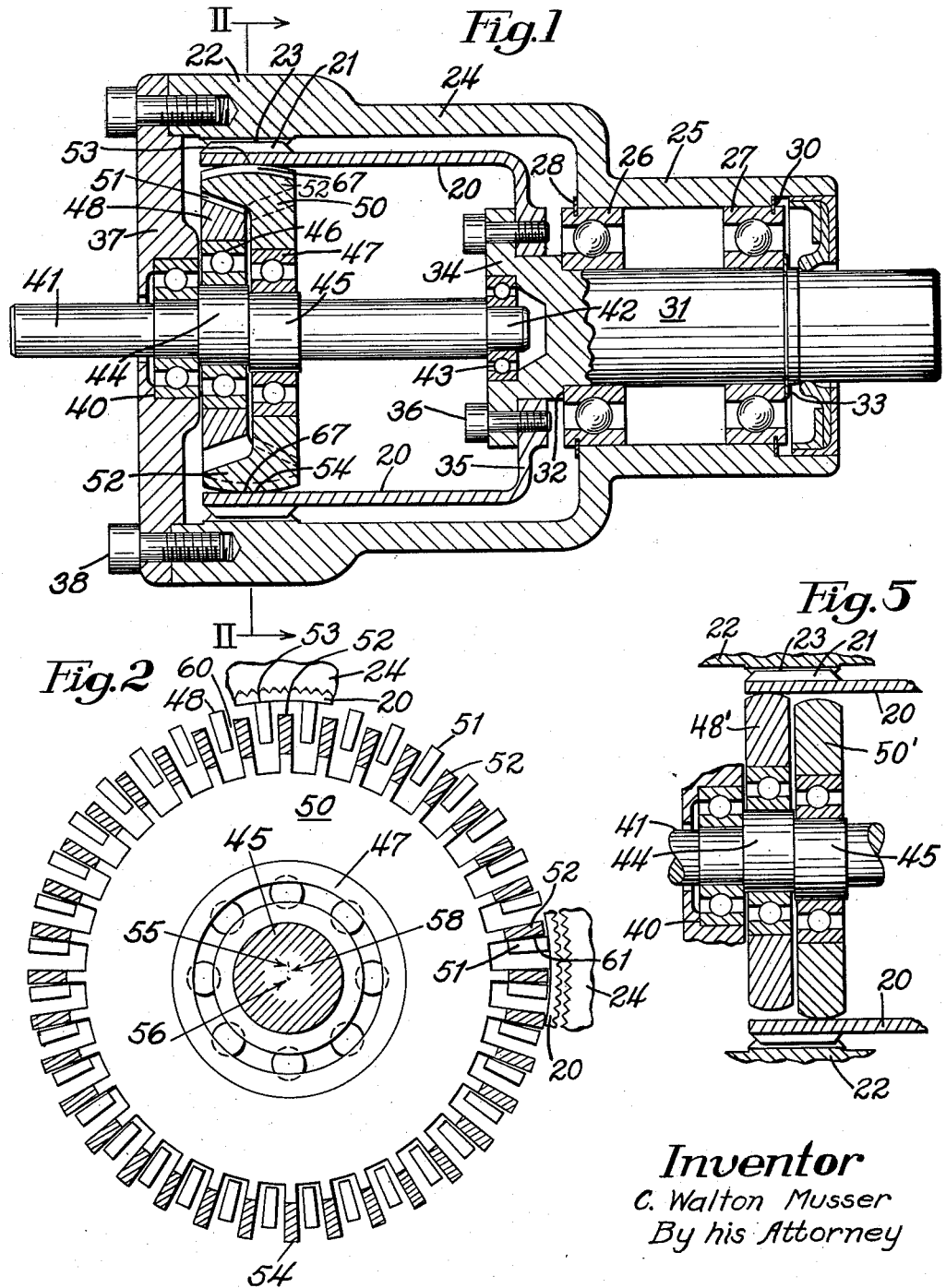
Inventor
C. Walton Musser
By his Attorney Dec. 15, 1964  C. W. MUSSER  3,161,082
WAVE GENERATOR
Filed April 11, 1962  2 Sheets-Sheet 2 ns or different types of lubrication permit relatively large changes in the speed at which a bearing can be operated. For any one set of conditions, however, the DN value is considered to be the controlling factor.

3,161,082
WAVE GENERATOR
C. Walton Musser, Palos Verdes Estates, Calif., assignor to United Shoe Machinery Corporation, Boston, Mass., a corporation of New Jersey
Filed Apr. 11, 1962, Ser. No. 187,175
20 Claims. (Cl. 74—640)

The present invention relates to harmonic drives and particularly to wave generators for use in rotary-to-rotary harmonic drive transmissions.

A purpose of the invention is to render the bearings required for harmonic drive wave generators less expensive and permit the use of conventional bearings for this purpose.

A further purpose is to permit harmonic drives and particularly the wave generators for harmonic drives to operate at higher speeds.

A further purpose is to permit the use of smaller bearings for the wave generators of harmonic drives.

A further purpose is to reduce the input inertia of the wave generator of a harmonic drive.

A further purpose is to lower the starting friction of the wave generator of a harmonic drive.

Further purposes appear in the specification and in the claims.

In the preferred embodiment the harmonic drive wave generator of the invention employs a plurality, suitably two, slotted wave generators or wave generator discs mounted on eccentric ball bearings. The outer edges or tangs of the slotted wave generators are related to each other in such a way that the teeth intertwine and produce essentially the elliptoidal shape that is common to wave generators for harmonic drive units.

Existing harmonic drive units commonly employ an elliptoidal bearing or cam follower rollers in the wave generator. Whenever the wave generator comprises an elliptoidal bearing, this is necessarily a special bearing configuration. The bearing race which undergoes deflection must be so thin that it can be readily deflected and the shape made to rotate within the outer race. Where cam follower rollers are used they cannot be larger than half the diameter and as a consequence they only support the flexspline for a very small arc.

In the device of the invention in its preferred embodiment two standard ball bearings are used as the wave generator bearings. Since the wave generator bearings can be conventional ball or roller bearings, they are much less expensive than a special design. Furthermore, the slotted wave generators or wave generator discs permit supporting the flexspline over a relatively large arc, and as a result a greater load can be carried without introducing any undue stresses in the flexspline.

The invention also offers the advantage that the wave generator can operate at high speeds. When an elliptoidal wave generator bearing is used in a harmonic drive, it is required to be of relatively large diameter in order to withstand the output torque. This output torque reacts on the pressure angle of the mating spline teeth, causing a radial load inwardly which puts a load on the elliptoidal bearing. This load in an elliptoidal bearing is by far the greatest at the major axis, and but a small number of balls actually support the load due to the flexibility of the outer race of the elliptoidal bearing. Since the elliptoidal bearing must be made relatively large in diameter, in many cases it cannot be operated at as high speeds as would be desirable. In bearings the speed at which the bearing can be operated is usually stated as a DN value. This is the inside or bore diameter D of the bearing in millimeters multiplied by the number of revolutions per minute N. Different lubrication sys- In the device of the present invention the input bearings of the wave generator have a relatively small diameter in the preferred embodiment, and consequently the operating speed can be considerably higher. Furthermore, since these bearings are supported on a solid shaft and within a relatively solid web of the wave generator, they have a larger number of balls supporting the load, and as a consequence the bearing can be made smaller for the same load-carrying capacity.

A further advantage of the present invention is a marked reduction in the input inertia of the wave generator. In many types of equipment, and in servomechanisms particularly, it is desirable to have as low an input inertia as possible. The major portion of the wave generator assembly described in the present invention does not rotate with the input shaft and, hence, contributes little to the input inertia. The only parts that directly rotate at input shaft speeds are the wave generator shaft and the inner race of the wave generator bearings. Since these parts are of relatively small diameter their rotational inertia is considerably lower than would be the case in a conventional harmonic drive wave generator.

Since the bearings are smaller in diameter they have a lower starting friction. Consequently, in a micropowered servomechanism a more reliable and reproducible action can be obtained.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a longitudinal section of a harmonic drive rotary-to-rotary transmission showing the improved wave generator of the invention.

FIGURE 2 is a fragmentary cross section of the wave generator taken along the line 2—2 of FIGURE 1, and showing the relation of the teeth on the circular spline and the teeth on the flexspline at the major axis and at the minor axis.

FIGURE 5 is a fragmentary axial section similar to FIGURE 1, showing a variation.

Figure 3:
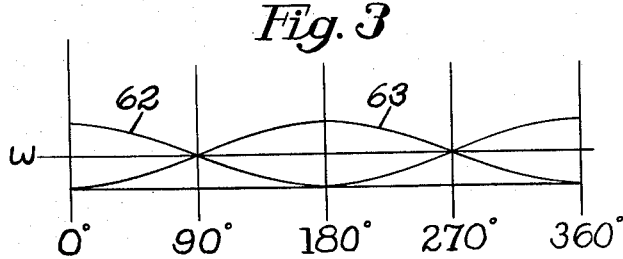
FIGURE 3 is a graph illustrating the angular velocity of the two halves of the wave generator and plotting angular velocity of the tangs as ordinates and angular position around the circumference as abscissae.

FIGURE 1 shows a rotary-to-rotary harmonic drive transmission which in many of its features may be generally conventional, having a flexspline 20 provided with flexspline teeth 21 around the outside of the end of the flexspline 20. These flexspline teeth 21 are of the same tooth form and interengage with circular spline teeth 23 which are around the inside of a circular spline 22. As well known in the operation of harmonic drive assemblies, one of the two splined members is relatively movable with respect to the other and serves as a reaction element. FIGURE 1 illustrates a construction in which the circular spline 22 is integral with a relatively stationary housing 24 of the unit. At the opposite end of the housing 24 there is a section 25 of reduced diameter wherein the bearings for the output shaft are located. Output bearings 26 and 27, suitably ball bearings, are held in axial position within an end 25 of the housing by conventional bearing snap rings 28 and 30.

Rotatably mounted at the center or axis within these output bearings 26 and 27 there is an output shaft 31 which is axially held in position by a shoulder 32 and a conventional snap ring 33. The end of the output shaft adjoining the flexspline has a flanged extension 34. The end of the flexspline 20 adjoining the output shaft has a flanged portion 35 which is bolted to the output shaft flanged extension 34 by cap screws 36.

The end of the housing is closed by an end cap 37 which is fastened to the housing by cap screws 38. This end cap 37 mounts an axis input shaft bearing 40, suitably a ball or roller bearing. Wave generator shaft 41, which in the preferred embodiment is the input shaft, rotates about the axis within this bearing 40. Wave generator shaft 41 extends through the bearing 40 and has a portion 42 of reduced diameter at the far end which fits within spigot bearing 43, suitably a ball or roller bearing, mounted in the flanged extension 34 of the output shaft 31. On the wave generator shaft 41 there are two eccentrics 44 and 45. Each of these eccentrics has the same amount of eccentricity with the center line or axis of the wave generator shaft 41 and the eccentricity of one of the eccentrics is 180° out of phase with the eccentricity of the other eccentric. Therefore, in FIGURE 1 the eccentric 44 is displaced toward the top of the figure and the eccentric 45 is displaced toward the bottom of the figure.

Mounted on these two eccentrics 44 and 45 are respective circular wave generator bearings 46 and 47. In the preferred embodiment these are ball or roller bearings. In the particular form shown the bearings 46 and 47 are intended to be shrunk fit or forced fit on the input shaft. Any other conventional means of fastening to the input shaft may be used. The form shown which has a press fit in the bore diameter of the bearing and also the outside diameter of the bearing is merely for illustrative purposes.

Rotatably mounted on the bearings 46 and 47 are respectively slotted wave generators or wave generator discs 48 and 50. The slotted wave generator 48 is mounted on the bearing 46 and the slotted wave generator 50 is mounted on the bearing 47. These wave generators are desirably identical in configuration but they are placed face to face so that tangs 51 on the one wave generator 48 are respectively interposed between tangs 52 on the other wave generator 50.

Since these two wave generators 48 and 50 are circular and mounted on the eccentrics 44 and 45, the one wave generator 48 is eccentric with respect to the other wave generator 50. The arrangement may be visualized from FIGURE 2, at the major axis the flexspline teeth 21 interengage and are in contact with the circular spline teeth 23 and at the minor axis the flexspline teeth 21 are separated from and clear the flexspline teeth 23 as well known in harmonic drives. For a more complete description of the latter, reference may be had to United States Patents Nos. 2,906,143, 2,959,065 and 2,943,495.

FIGURE 2 shows the contact points 53 and 54. Here it can be seen that the slotted wave generator 48 is rotating around a center of rotation 55 and the slotted wave generator 50 is rotating around a center of rotation 56. The distance between centers 55 and 56 is the eccentricity of one wave generator 48 with respect to the other wave generator 50, and of course the distance between the center of rotation 58 of the input wave generator shaft 41 and the respective eccentric centers 55 and 56 is the eccentricity of each wave generator 48 or 50 with respect to the input shaft or wave generator shaft 41.

Since the location at which section II—II of FIGURE 1 is taken is between the wave generators or wave generator discs 48 and 50, the eccentric 45 is illustrated in FIGURE 2 as well as the bearing 47. Wave generator 50 then rotates around the input shaft eccentric 45 which has its center of rotation at 56. The tangs 52 of this wave generator 50 are illustrated in their relationship with the tangs 51 of the wave generator 48. It can be seen in FIGURE 2 that the tangs 52 are connected to the wave generator 50 while the tangs 51 do not show a connection since this connection has been sectioned away. Tangs 53 of wave generator 48 have not been shown with section lines to make them more distinct from the sectioned tangs 54 of wave generator 50.

It can be seen in FIGURES 1 and 2 that the contact points with the interior of the flexspline 20 are 53 and 54. It can also be seen that as the input shaft or wave generator shaft 41 is rotated, this will cause the centers of the wave generator eccentrics 44 and 45 to rotate about the input shaft axis and cause an advancement or rotation of the contact points 53 and 54 within the flexspline 20. This then will cause rotation of an elliptoidal shape of the flexspline 20 in essentially the same manner as rotation of an elliptoidal wave generator.

Since the two slotted wave generators 48 and 50 have their tangs interposed and they are eccentric with respect to one another, the tangs must have a clearance so as to allow for the eccentricity. This is illustrated in FIGURE 2 where it can be seen along the vertical axis that the tangs 52 have their maximum clearance 60 and are directly between the tangs 51. At the horizontal axis the tangs 52 and 51 are lying nearest one another and have their minimum clearance 61.

As the input shaft is rotated it causes a variation in the angular velocity of the respective tangs as illustrated in FIGURE 3. Here W represents the angular velocity of a tang in relation to its position in reference to the point of contact 53 or 54. In this particular diagram the vertical axis has been taken as the zero position and the horizontal axis has been taken as the 90° and 270° positions. Thus, it can be seen that the angular velocities of the tangs 51 and 52 vary with their circumferential position. At the point where they are in contact with the flexspline they have an angular velocity of zero, and at the point directly opposite this they have the maximum angular velocity. Of course, the maximum angular velocity is governed by the input rotational speed as well as by the amount of eccentricity of the unit. Since the variation in angular velocity takes the form of sine waves 62 and 63 and varies from a maximum to 0 in both of the wave generators or wave generator discs, the tangs in essence only move back and forth between one another. However, as the shape rotates, the tangs at the major axis are always separated and the tangs at the minor axis are always closest together.

Figure 4:
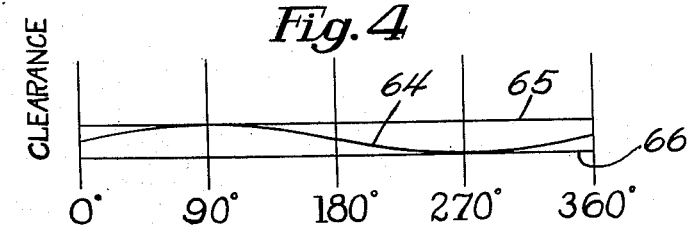
FIGURE 4 is a graph illustrating the clearance between the tangs of the wave generators as ordinates plotted against the angle around the circumference as abscissae.

FIGURE 4 illustrates the actual clearance between these tangs. Here the curve 64 represents the clearance of the tangs 51 from the both sides of the tangs 52. The line 65 represents one side of the tanks 52 and the line 66 represents the other side of the tanks 52. It can be seen here that the clearance between the tangs varies with the angular position. Along the major axis the clearance of line 64 representing the sides of tank 51 is equidistant to both sides of tanks 52, represented by lines 65 and 66. At the 90° minor axis the clearance is the least, and in FIGURE 4 it is shown as 0, to one side 65. At the 270° minor axis it is the least to the other side 66.

While the form illustrated in FIGURES 1 and 2 shows the wave generator inside the flexspline and the flexspline inside the circular spline, it will be evident as illustrated in the patents above referred to, that the relative arrangement of parts can be reversed as desired.

The projections on the wave generator are usually referred to as lobes. While FIGURES 1 and 2 illustrate a two-lobed form, in which the points of deflection of the flexspline (so that its teeth mate and are in contact with the teeth of the circular spline) are diametrically opposite, it will be understood that three or more lobes can be employed on the wave generator as shown in the patents above referred to. In the case where there are more than two lobes on the wave generator, there will be one point of contact and mesh of the teeth on the flexspline with the teeth on the circular spline for each lobe, equally circumferentially distributed. This will, therefore, require one wave generator eccentric and one wave generator for each lobe, the eccentrics being positioned opposite the lobes.

As in previous forms of harmonic drive, the difference in the number of teeth between the circular spline and the flexspline is equal to or a multiple of the number of lobes on the wave generator. Thus, in the form of FIGURES 1 and 2, where there are two lobes on the wave generator, the difference in the number of teeth between the circular spline (which has the greater number of teeth) and the flexspline (which in the particular form has a smaller number of teeth) will be 2, 4, etc.

It will be evident that unslotted discs or plain washer-like discs may be used to produce the rotation of the wave form, as shown in FIGURE 5. In this form the bearings 46 and 47 support wave generators 48' and 50' which are of circular outer contour and are continuous instead of being slotted at the outer circumference. One difficulty presented in this form is that one wave generator is at a different position axially behind the teeth of the flexspline with respect to the other wave generator. Thus, one wave generator will cause one end of the flexspline teeth to be in contact and the other wave generator will cause the other end of the flexspline teeth to be in contact. Using discs may be objectionable in a cup-shaped flexspline due to the slight coning action of the cup end when it is directed into an elliptoid. This coning action actually is a desirable feature in the version of FIGURE 1 since it is very effective in reducing backlash and also produces a beneficial centering action for the wave generator. In the device of FIGURES 1 and 2 both wave generators produce the same identical type of contact with the inside of the flexspline, due particularly to the fact that the tangs as seen in axial section in FIGURE 1 have arcuate surfaces 67 which engage in the general plane immediately behind the middle of the flexspline teeth as shown.

In operation it will be evident that the wave generators 48 and 50 or 48' and 50' mounted on the eccentrics on the wave generator shaft turn when the wave generator shaft turns and cause the points at which the flexspline is deflected into mesh and contact with the circular spline to travel in the form of a wave motion around the circumference. This causes relative motion between the circular spline and the flexspline in the manner well known in the art in respect to harmonic drives.

In view of my invention and disclosure, variations and modifications to meet individual whim or particular need will doubtless become evident to others skilled in the art, to obtain all or part of the benefits of my invention without copying the structures shown, and I, therefore, claim all such insofar as they fall within the reasonable spirit and scope of my claims.

Having thus described my invention what I claim as new and desire to secure by Letters Patent is:

1. In a harmonic drive having a circular spline provided with spline teeth and serving as a reaction member, and having a flexspline provided with spline teeth which cooperate with the spline teeth on the circular spline, the circular spline and flexspline being relatively movable one within another, and the flexspline having its teeth in mesh and in contact with the teeth of the circular spline at a plurality of spaced points, the teeth of the flexspline being out of contact and out of mesh with the teeth of the circular spline at intermediate points, in combination, a wave generator shaft, eccentrics mounted on the wave generator shaft, one for each of the points at which the teeth of the flexspline are in contact and in mesh with the teeth of the circular spline, and wave generators, one on each eccentric, the wave generators having eccentric centers of rotation with respect to the wave generator shaft and a generally circular outside contour concentric with their respective eccentrics, each wave generator engaging the flexspline by a pressure element at a position opposite one of the points at which the teeth on the flexspline are in mesh and in contact with the teeth on the circular spline.

2. A harmonic drive of claim 1, in combination with a wave generator bearing on each eccentric rotatably mounting one of the wave generators from the eccentric.

3. A harmonic drive of claim 1, in which each wave generator has at the outside a plurality of radially and axially extending tangs which form the pressure element.

4. A harmonic drive of claim 3, in which said tangs are interposed and extend over the same axial distance in contact with the flexspline, and have circumferential clearance which permits eccentric motion.

5. A harmonic drive of claim 1, in combination with a circular wave generator bearing mounted on each eccentric and supporting the wave generator from such eccentric, each eccentric having a plurality of radially and axially extending tangs which operate as the pressure element and form an exterior circular contour which is eccentrically moved.

6. A harmonic drive of claim 5, in which the tangs of the different wave generators are interposed and have circumferential clearance which permits eccentric motion to propagate a wave form.

7. A harmonic drive of claim 6, in which said tangs extend over the same axial distance.

8. In a harmonic drive having a circular spline provided with circular spline teeth and serving as a reaction member, and having a flexspline provided with flexspline teeth which cooperate with the circular spline teeth, one of the circular spline and flexspline being relatively movable within the other, and the teeth of the flexspline being in mesh and in contact with the teeth of the circular spline at two diametrically opposite points, said teeth of the flexspline being out of contact and out of mesh with the teeth of the circular spline at intermediate points, in combination, a wave generator shaft, a pair of eccentrics respectively 180° out of phase mounted on the wave generator shaft, and a wave generator mounted on each eccentric, said wave generator having eccentric centers of rotation with respect to the wave generator shaft on opposite sides of the axis of said shaft and having at the radial outer edge a generally circular pressure element which engages the flexspline on the side remote from the flexspline teeth opposite one of the points at which the teeth of the flexspline are in mesh and in contact with the teeth of the circular spline, said wave generators propagating an elliptoidal shape around the flexspline when the wave generator shaft turns.

9. A harmonic drive of claim 8, in combination with a circular wave generator bearing on each eccentric rotatably mounting one of the wave generators.

10. A harmonic drive of claim 8, in which the pressure elements of the wave generators comprise radially extending tangs at the outside.

11. A harmonic drive of claim 10, in which said tangs are interposed with one another.

12. A harmonic drive of claim 11, in which said interwined tangs of the respective wave generators extend over the same axial length.

13. A harmonic drive of claim 8, in combination with a circular wave generator bearing on each eccentric mounting one of the wave generators, said pressure elements on the said wave generators comprising tangs extending radially.

14. A harmonic drive of claim 13, in which said tangs are intertwined with one another and have lateral freedom to permit eccentric motion between one another.

15. A harmonic drive of claim 14, in which said interposed tangs extend over the same axial distance.

16. In a harmonic drive having a circular spline provided with interior teeth and serving as a reaction member, a relatively movable flexspline within the circular spline having exterior teeth which cooperate with the teeth on the circular spline, the teeth on the flexspline being in contact and in mesh with the teeth on the circular spline at two diametrically spaced points and being out of mesh at intermediate points, a wave generator shaft within the flexspline, two eccentrics 180° out of phase mounted on the wave generator shaft within the flexspline and a wave generator on each eccentric, said wave generators having eccentric centers of rotation with respect to the wave generator shaft, respectively, and having generally circular pressure elements at the outer circumference, the pressure elements of one wave generator engaging and deflecting the flexspline opposite the point at which the teeth are in contact and in mesh.

17. A harmonic drive of claim 16, in combination with circular wave generator bearings on the eccentrics mounting the wave generators rotationally.

18. A harmonic drive of claim 17, in which said pressure elements comprise interposed tangs at the radially outer ends of the wave generators, said tangs having lateral freedom for eccentric motion and being relatively far apart at the points where the flexspline teeth are in contact and in mesh with the teeth of the circular spline and relatively close together at points opposite those at which the flexspline teeth are out of contact and out of mesh with the teeth of the circular spline.

19. A harmonic drive of claim 16, in which said tangs on both wave generators have the same axial length.

20. A harmonic drive of claim 19, in which said tangs are of arcuate contour when viewed in axial section.

References Cited in the file of this patent

UNITED STATES PATENTS

| | | |
|---|---|---|
| 2,919,589 | Sundt | Jan. 5, 1960 |
| 2,972,910 | Menge | Feb. 28, 1961 |
| 3,039,324 | Waterfield | June 19, 1962 |

UNITED STATES PATENT OFFICE
CERTIFICATE OF CORRECTION

Patent No. 3,161,082

December 15, 1964

C Walton Musser

It is hereby certified that error appears in the above numbered patent requiring correction and that the said Letters Patent should read as corrected below.

Column 4, lines 51, 52 and 56, for "tanks", each occurrence, read -- tangs --; line 55, for "tank" read -- tang --; column 6, line 39, for "generator" read -- generators --; lines 57 and 58, for "interwined" read -- intertwined --.

Signed and sealed this 14th day of September 1965.

(SEAL)
Attest:

ERNEST W. SWIDER
Attesting Officer

EDWARD J. BRENNER
Commissioner of Patents